United States Patent
Tang et al.

(10) Patent No.: US 7,642,907 B2
(45) Date of Patent: Jan. 5, 2010

(54) WIRELESS BUCKLE-UP DETECTION USING RF TECHNOLOGY

(75) Inventors: Tom Q. Tang, Novi, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 98 days.

(21) Appl. No.: 11/306,283

(22) Filed: Dec. 21, 2005

(65) Prior Publication Data

US 2007/0139173 A1  Jun. 21, 2007

(51) Int. Cl.
*B60Q 1/00* (2006.01)
(52) U.S. Cl. .................................. 340/457.1; 340/438
(58) Field of Classification Search .............. 340/457.1, 340/438; 180/268
See application file for complete search history.

(56) References Cited

U.S. PATENT DOCUMENTS

| | | | |
|---|---|---|---|
| 4,955,038 A | 9/1990 | Lee et al. | |
| 5,461,385 A * | 10/1995 | Armstrong | 342/42 |
| 5,463,374 A | 10/1995 | Mendez et al. | |
| 5,744,874 A | 4/1998 | Yoshida et al. | |
| 6,474,683 B1 * | 11/2002 | Breed et al. | 280/735 |
| 6,593,845 B1 | 7/2003 | Friedman et al. | |
| 2002/0084324 A1 * | 7/2002 | Johnson et al. | 235/385 |
| 2003/0014166 A1 | 1/2003 | Chinigo et al. | |
| 2004/0119599 A1 | 6/2004 | Stevenson et al. | |
| 2004/0130442 A1 * | 7/2004 | Breed et al. | 340/443 |
| 2005/0061568 A1 * | 3/2005 | Schondorf et al. | 180/268 |
| 2005/0156726 A1 * | 7/2005 | Rubel | 340/457.1 |

FOREIGN PATENT DOCUMENTS

| | | |
|---|---|---|
| DE | 10203139 A1 | 8/2002 |
| DE | 69721815 T2 | 3/2004 |
| EP | 1669249 A1 | 6/2006 |
| FR | 2880321 A1 | 7/2006 |
| GB | 2332234 A | 6/1999 |
| JP | 2001018748 A | 1/2001 |
| JP | 2003244013 A | 8/2003 |
| WO | 02093857 A1 | 11/2002 |

OTHER PUBLICATIONS

Great Britain Search and Examination Report corresponding to Application No. GB0625019.5, mailed Mar. 30, 2007, 7 pages.
Great Britain Examination Report corresponding to Application No. GB0625019.5, mailed Mar. 5, 2008, 3 pages.
German Office Action corresponding to Application No. DE 10 2006 055 598.8, mailed Sep. 26, 2007, 3 pages.

* cited by examiner

*Primary Examiner*—Daniel Wu
*Assistant Examiner*—Shirley Lu
(74) *Attorney, Agent, or Firm*—Brooks Kushman P.C.

(57) ABSTRACT

An automotive restraint monitoring assembly is provided comprised of a seatbelt assembly including a buckle element and clip element affixed to an automotive seat assembly. A wireless transponder element and transponder antenna are positioned within the buckle element and transmit a seat-based unique identification signal only when the clip element is positioned within the buckle element. A base station mounted within a vehicle includes at least one base station antenna in wireless communication with the wireless transponder. A vehicle belt alert system is in communication with the base station.

20 Claims, 2 Drawing Sheets

US 7,642,907 B2

WIRELESS BUCKLE-UP DETECTION USING RF TECHNOLOGY

TECHNICAL FIELD

The present invention relates generally to an apparatus for determining automotive passenger buckle-up status and more particularly to an apparatus for determining automotive passenger buckle-up status using wireless transmission technology.

BACKGROUND OF THE INVENTION

Automotive designs are pressed into being more flexible and modifiable both by manufacturers as well as end consumers. In addition to their flexibility, their structures must accommodate an ever-increasing range of electronic features. As such, wiring become complicated and costly. In addition, complex hard wiring schemes may interfere with the design flexibility sought after by consumers.

One such incidence of the conflict between electronic features and desired flexibility arises in the field of passenger safety detection. Specifically, existing automotive safety features commonly call for the electronic determination of passenger presence and proper seatbelt usage during vehicle operation. Existing hard-wired systems, however, add undue cost and complexity to vehicle manufacturing. In addition, in the case of features such as removable seat rows, often existing hard wire systems are difficult or impossible to apply to such seating. What is needed is a buckle-up status system that was not reliant on hard wiring to operate such that removable or replaceable seats would not impact sensor system performance. It would be further valuable to have such a system that could be integrated into existing vehicle operating systems to improve cost effectiveness and simplicity of installation.

SUMMARY OF THE INVENTION

In accordance with the objects of the present invention an automotive restraint monitoring assembly is provided comprised of a seatbelt assembly including a buckle element and clip element affixed to an automotive seat assembly. A wireless transponder element and transponder antenna are positioned within the buckle element and transmit a seat-based unique identification signal only when the clip element is positioned within the buckle element. A base station mounted within a vehicle includes at least one base station antenna in wireless communication with the wireless transponder. A vehicle belt alert system is in communication with the base station.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
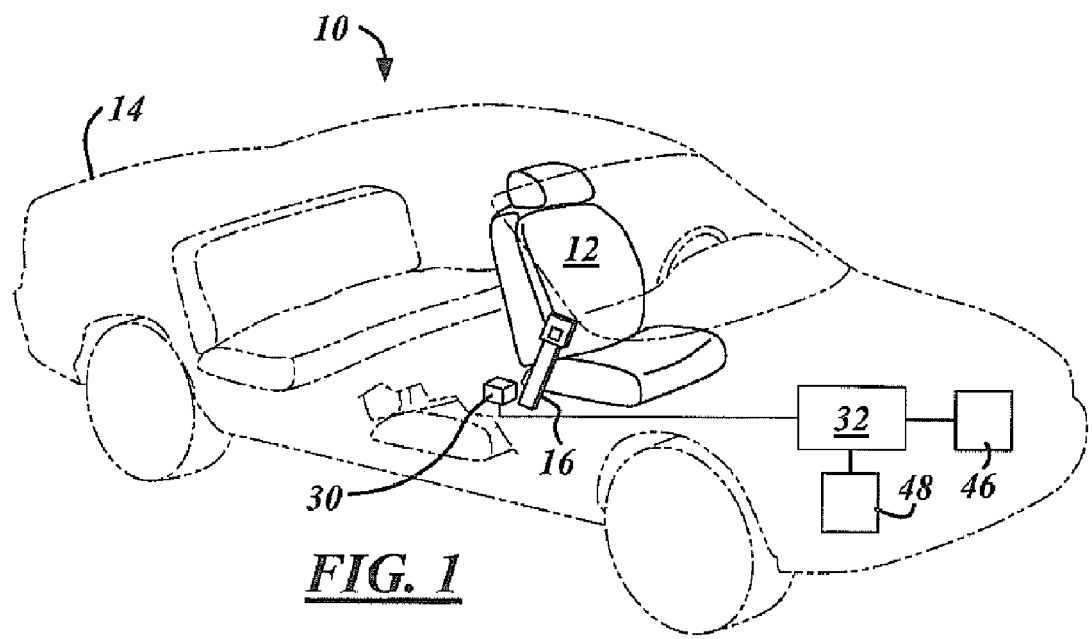
FIG. 1 is an illustration of an automotive restraint monitoring assembly in accordance with the present invention.
Figure 2:
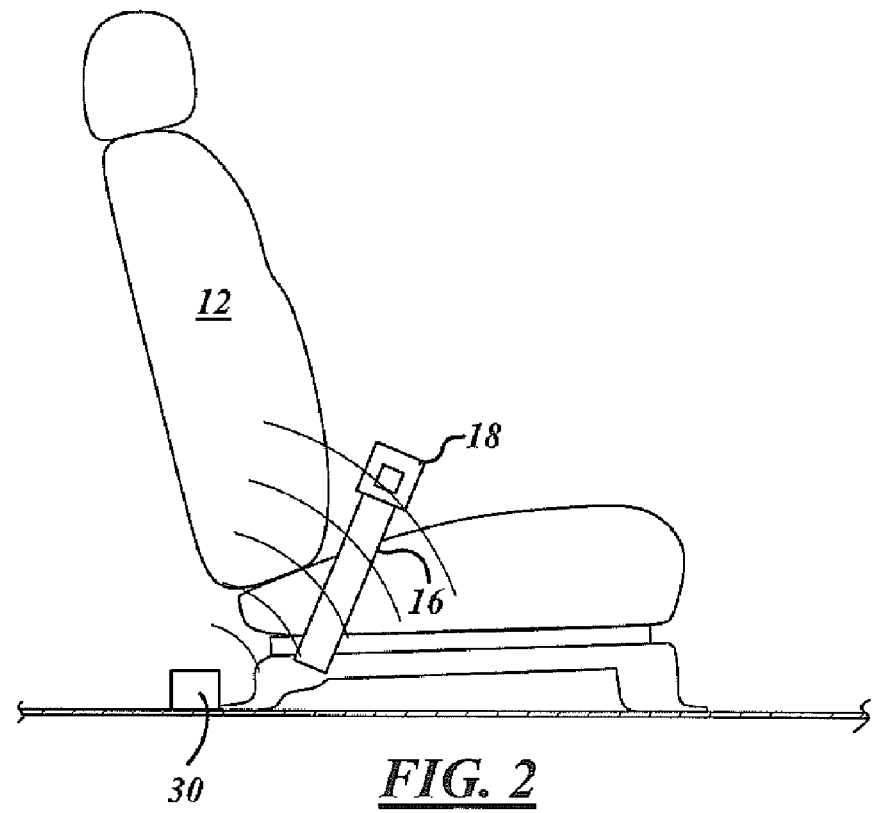
FIG. 2 is a detailed illustration of the automotive restraint monitoring assembly illustrated in FIG. 1.
Figure 3:
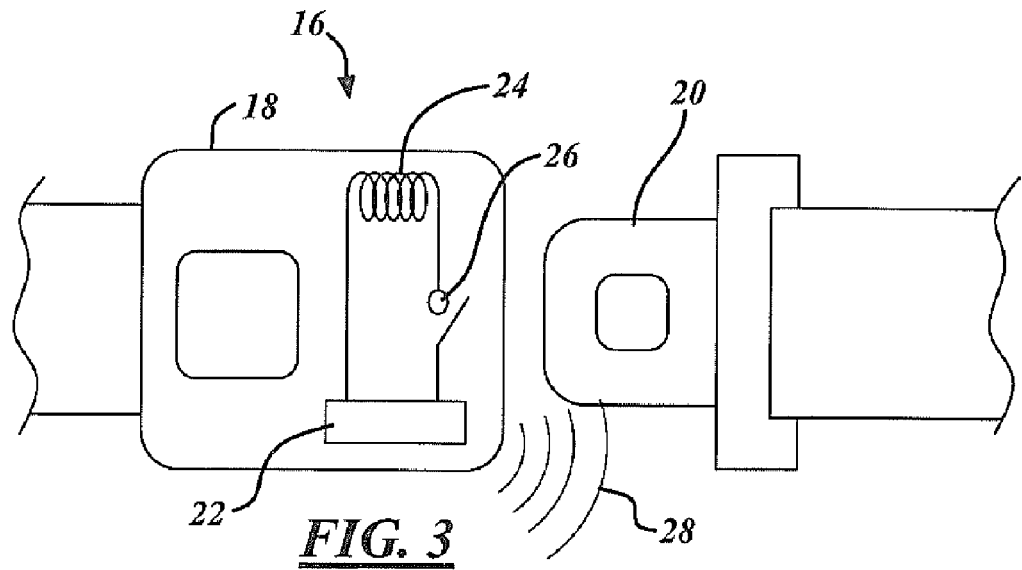
FIG. 3 is a detail illustration of seatbelt assembly for use in the automotive restraint monitoring assembly illustrated in FIG. 1.
Figure 4:
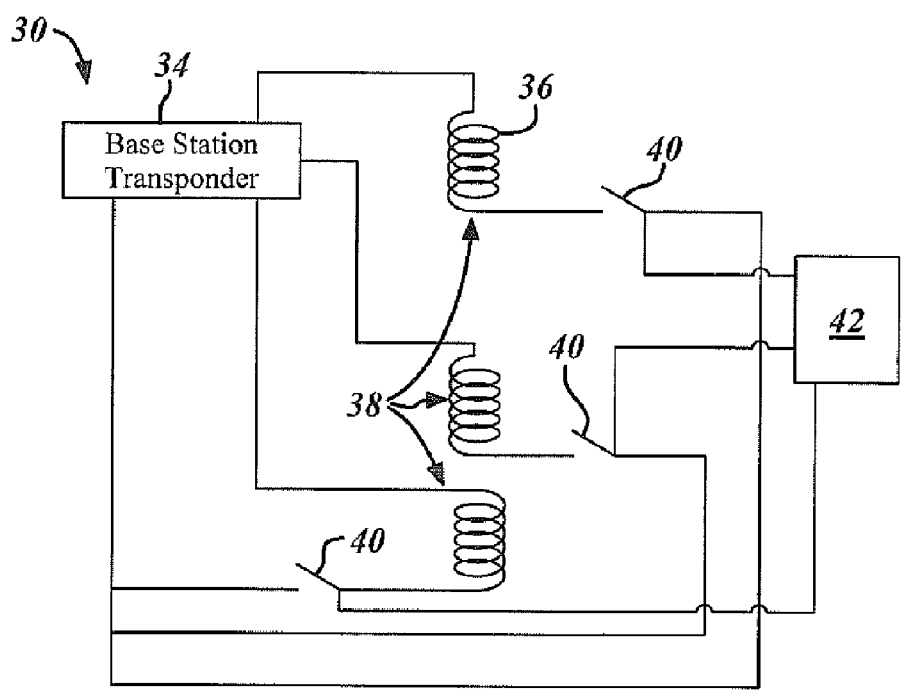
FIG. 4 is a detail illustration of a base station for use in the automotive restraint monitoring assembly illustrated in FIG. 1.

Referring now to FIG. 1, which is an illustration of an automotive restraint monitoring assembly 10 in accordance with the present invention. The assembly 10, includes a plurality of seat assemblies 12 mounted within a vehicle 14. A seatbelt assembly 16, or a plurality thereof, are mounted to each of the seat assemblies 12. Each seatbelt assembly 16 includes a buckle element 18 and a clip element 20 as is understood in the art.

Each buckle element 18 includes a wireless transponder element 22 and a transponder antenna 24 disconnected by a transponder switch 26. When the clip element 20 is inserted into the buckle element 18, the clip element 20 closes the transponder switch 26 and a seat based unique identification signal 28 is generated. In another contemplated embodiment, the wireless transponder element 22 can generate a first unique identification signal 28 when the buckle element 18 is inserted and a second unique identification signal 28 when the buckle 18 is removed. A variety of unique identifications signals 28 are contemplated, but they all allow for a clear identification of buckle element 18 location (and/or status) by signal identifier alone. In one embodiment, it is contemplated that the wireless transponder element 22 can be an active radio frequency transponder. In another embodiment, it is contemplated that the wireless transponder element 22 is a passive transponder powered by a magnetic field generated by an outside source such as a base station 30.

The base station 30 is preferably remotely mounted within the vehicle 14 such as directly below the seat assembly 12. The base station 30 is in communication with a vehicle alert system 32 to report buckle element 20 and clip element 20 engagement status for each unique identification signal 28. Although a variety of base stations are contemplated, one embodiment contemplates the base station 30 comprising a base station transponder 34 in communication with at least one base station antenna 36 to receive the unique identification signals 28. The base station antenna 36 is preferably in close proximity to the transponder antenna 24 to ensure proper communication. Although a single antenna 36 may be utilized, it is contemplated a plurality of antennas 38 may be utilized.

Each base station antenna 36 may include a base station switch 40 activated by an occupant presence. As such, the present invention may include an occupant passenger presence sensor 42 in communication with each base station switch 40. It is preferably that the occupant passenger presence sensor 42 be remotely positioned in the base station 30. As such, the present invention contemplates the use of a passive presence sensor 42 such as, but not limited to, an infra-red sensor, an ultrasonic sensor, or a capacitive sensor.

In another unique and novel aspect of the present invention, it is contemplated that the base station 30 may not be an independent entity positioned under the seat assembly 12. Instead the present invention contemplates the use of an alternate purpose automotive receiver 44. An alternate purpose automotive receiver 44 is intended to encompass any existing automotive receiver presently dedicated to a remote system other that seatbelt monitoring. This includes, but is not limited to a remote keyless entry receiver 46 or a tire pressure monitor receiver 48. By placing one of these alternate purpose automotive receivers 44 in communication with the vehicle belt alert system 32, and configuring the alternate purpose automotive receivers 44 to receive and transmit the unique identification signals 28, the present invention can be incorporated into any vehicle system with minimal cost and with new and novel levels of efficiency.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An automotive restraint monitoring assembly comprising:
   a seatbelt assembly including a buckle element and clip element affixed to an automotive seat assembly;
   a wireless transponder element and transponder antenna positioned within said buckle element, said wireless transponder element wirelessly transmitting a seat-based unique identification signal when said clip element is positioned within said buckle element;
   a base station mounted within a vehicle including at least one base station antenna in wireless communication with said wireless transponder;
   a vehicle belt alert system in communication with said base station;
   a switch within the buckle element, said switch being operable between a closed position and an open position, said closed position electrically connecting the transponder element to said transponder antenna, said open position electrically disconnecting said transponder element from said transponder antenna;
   wherein said switch is biased to remain in said open position except when said clip is insert into said buckle, said wireless transponder element is only connected to said transponder antenna when said clip element is inserted into buckle element;
   a seat occupant sensor within each automotive seat assembly, said seat occupant sensor transmitting a signal indicative of whether the automotive seat assembly is occupied or unoccupied; and
   wherein said base station identifies each automotive seat assembly having a fastened seat belt based on said signals transmitted from said wireless transponder element of each buckle element indicating insertion of the clip element within said buckle element, wherein said base station includes a plurality of seat antennas to receive said signals transmitted from the buckle elements, wherein one or more of said plurality of seat antennas are selectively enabled to receive said signal from said buckle elements according to signals received from said seat occupant sensors, wherein at least one of said one or more seat antennas selectively enabled to receive signals from a first one of said buckle elements when a first one of the plurality of said automotive seat assemblies is occupied is not also enabled to receive signals from a second one of said buckle elements when a second one of said plurality of automotive seat assemblies is occupied.

2. An automotive restraint monitoring assembly as described in claim 1, wherein said base station antenna comprises:
   a plurality of base station antennas each positioned in close proximity to one of a plurality of seatbelt assemblies, wherein a selected one of said plurality of base station antennas becomes active in response to activation of a selected one of a plurality of seat occupant sensors.

3. An automotive restraint monitoring assembly as described in claim 1, wherein said base station comprises a remote-keyless entry receiver.

4. An automotive restraint monitoring assembly as described in claim 2, further comprising:
   said occupant passenger presence sensor in communication with said base station, said occupant passenger presence sensor operating without physical connection to said automotive seat assembly.

5. A automotive restraint monitoring assembly as described in claim 4, wherein said occupant passenger presence sensor comprises a passive infra-red sensor.

6. A automotive restraint monitoring assembly as described in claim 4, wherein said occupant passenger presence sensor comprises an ultrasonic sensor.

7. A automotive restraint monitoring assembly as described in claim 4, wherein said occupant passenger presence sensor comprises a capacitive sensor.

8. A automotive restraint monitoring assembly as described in claim 4, wherein said at least one base station antenna comprises:
   a plurality of base station antennas each positioned in close proximity to one of a plurality of seatbelt assemblies, each of said plurality of base station antennas including a base station switch operable in response to said occupant passenger presence sensor.

9. An automotive restraint monitoring assembly as described in claim 1, wherein said clip element physically actuates said switch from said open position to said closed position during insertion into said buckle element.

10. An automotive restraint monitoring assembly as described in claim 1, wherein said clip element presses against a lever arm of said switch to move said switch from said open position to said closed position during insertion, wherein said lever arm is biased to return to said open position when said clip element is removed from said buckle element.

11. An automotive restraint monitoring assembly as described in claim 1, wherein said transponder element relies on power provided by a vehicle battery to transmit said seat-based unique identification signal.

12. An automotive restraint monitoring assembly as described in claim 1, wherein said transponder element continuously attempts to transmit said seat-based unique identification signal regardless of whether said switch is in said open position and said closed position, said seat-based unique identification signal only being transmitted from said transponder antenna when said switch is in said closed position.

13. An automotive restraint monitoring assembly as described in claim 1, wherein said seat-based unique identification signal is continuously transmitted at predefined intervals while said switch is in said closed position.

14. A seating system for assessing whether seat belts included within a plurality of seats positioned within different areas of a vehicle are fastened based on insertion of a seat belt clip within a seat belt buckle, the system comprising:
   a transponder and a antenna within the seat belt buckle of each of the plurality of seats, each transponder controlling the antenna to transmit a signal that uniquely identifies the seat when the seat belt buckle receives the seat belt clip;
   a switch within each seat belt buckle, the switch forming part of a current path between the transponder and the antenna, the switch moving to an first position when the seat belt clip is inserted into the seat belt buckle and to a second position when the seat belt clip is removed from the seat belt buckle, he first position permitting current flow and the second position preventing current flow through the current path between the transponder and the antenna;

a seat occupant sensor within each of the seats, the seat occupant sensor transmitting a signal indicative of whether the seat is occupied or unoccupied; and a base station for identifying each seat having a fastened seat belt based on the signals transmitted from the antennas of each seat belt buckle indicating insertion of the seat belt clip within the seat belt buckle, wherein the base station includes a plurality of seat antennas to receive the signals transmitted from the seat belt buckles, wherein one or more of the plurality of seat antennas are selectively enabled to receive the signal from the seat belt buckles according to signals received from the seat occupant sensors, wherein at least one of the one or more seat antennas selectively enabled to receive signals from a first one of the seat belt buckles when a first one of the plurality of seats is occupied is not also enabled to receive signals from a second one of the seat belt buckles when a second one of the plurality of seats is occupied.

15. The system of claim 14 wherein each switch includes a lever arm through which the current flows, wherein the lever arm of each switch is moved from the second position to the first position by the seat belt clip during insertion into the seat belt buckle, wherein the lever arm is biased to return to the second position when the seat belt clip is removed from the seat belt buckle.

16. The system of claim 14 wherein the transponders and based station rely on power provided by a vehicle battery to transmit the signals and identify each seat having a fastened seat belt.

17. A seat belt system to facilitate wirelessly identifying a fastened seat belt comprising:

a clip connected a lap belt, the clip being at least partially composed of an electrically conducting material and shaped to included at least one aperture;

a buckle configured to retain the clip through engagement of the at least one aperture, the buckle include a transponder and antenna configured to transmit a signal that identifies the seat belt to be fastened when the clip is retained within the buckle;

wherein the clip establishes part of a current path required between the transponder and antenna in order to permit transmission of the signal, thereby preventing transmission of the signal unless the clip is inserted within the buckle;

a base station for identifying each seat having a fastened seat belt based on the signals transmitted from the antennas of each seat belt buckle indicating insertion of the clip within the buckle;

a seat occupant sensor within each of the seats, the seat occupant sensor transmitting a signal indicative of whether the seat is occupied or unoccupied; and wherein the base station includes a plurality of seat antennas to receive the signals transmitted from the buckles, wherein one or more of the plurality of seat antennas are selectively enabled to receive the signal from the buckles according to signals received from seat occupant sensors, wherein at least one of the one or more seat antennas selectively enabled to receive signals from a first one of the buckles when a first one of the plurality of seats is occupied is not also enabled to receive signals from a second one of the buckles when a second one of the plurality of seats is occupied.

18. The system of claim 17 wherein the buckle is powered by a vehicle battery to transmit the signal.

19. The system of claim 18 wherein the clip establishes the current path by at least a portion of the electrically conducting material of the clip carrying current between the transponder and the antenna.

20. The system of claim 17 wherein the clip establishes the current path by at least a portion of the electrically material of the clip carrying current between the transponder and the antenna.

* * * * *

UNITED STATES PATENT AND TRADEMARK OFFICE
CERTIFICATE OF CORRECTION

PATENT NO. : 7,642,907 B2  Page 1 of 1
APPLICATION NO. : 11/306283
DATED : January 5, 2010
INVENTOR(S) : Tom Q. Tang et al.

It is certified that error appears in the above-identified patent and that said Letters Patent is hereby corrected as shown below:

Column 3, Line 36, Claim 1:

After "inserted into" and before "buckle" insert -- said --.

Column 4, Line 67, Claim 14:

After "buckle" and before "first position" delete "he" and insert -- the --.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,642,907 B2
APPLICATION NO. : 11/306283
DATED : January 5, 2010
INVENTOR(S) : Tang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 182 days.

Signed and Sealed this

Twenty-first Day of December, 2010

David J. Kappos
*Director of the United States Patent and Trademark Office*